United States Patent
Lee et al.

(10) Patent No.: US 10,880,157 B2
(45) Date of Patent: Dec. 29, 2020

(54) METHOD AND DEVICE FOR TRANSMITTING DATA OVER A SELECTED LINK IN MULTILINK ENVIRONMENT

(71) Applicant: Samsung Electronics Co., Ltd., Gyeonggi-do (KR)

(72) Inventors: Ho-Yeun Lee, Gyeonggi-do (KR); Sung-Hoon Kim, Gyeonggi-do (KR); Seung-Ri Jin, Gyeonggi-do (KR); Jung-Je Son, Gyeonggi-do (KR); Duc-Key Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/340,910

(22) PCT Filed: Sep. 28, 2017

(86) PCT No.: PCT/KR2017/010864
§ 371 (c)(1),
(2) Date: Apr. 10, 2019

(87) PCT Pub. No.: WO2018/070715
PCT Pub. Date: Apr. 19, 2018

(65) Prior Publication Data
US 2019/0288908 A1 Sep. 19, 2019

(30) Foreign Application Priority Data
Oct. 10, 2016 (KR) .................. 10-2016-0130899

(51) Int. Cl.
*H04L 12/24* (2006.01)
*H04W 4/46* (2018.01)
(Continued)

(52) U.S. Cl.
CPC ...... *H04L 41/0803* (2013.01); *H04L 41/5003* (2013.01); *H04L 45/123* (2013.01);
(Continued)

(58) Field of Classification Search
CPC ..... H04W 28/10; H04W 40/02; H04W 40/12; H04W 40/24; H04W 48/18; H04W 48/20; H04W 4/46; H04W 76/14
See application file for complete search history.

(56) References Cited

U.S. PATENT DOCUMENTS

| 8,654,627 B2* | 2/2014 | Datz | H04L 45/00 |
| | | | 370/217 |
| 2004/0132451 A1* | 7/2004 | Butehorn | H04B 7/18584 |
| | | | 455/445 |

(Continued)

FOREIGN PATENT DOCUMENTS

| EP | 2 728 955 | 5/2014 | |
| EP | 2728955 A1 * | 5/2014 | ........ H04W 72/0473 |

(Continued)

OTHER PUBLICATIONS

PCT/ISA/210 Search Report issued on PCT/KR2017/010864 (pp. 4).

(Continued)

*Primary Examiner* — Mewale A Ambaye
(74) *Attorney, Agent, or Firm* — The Farrell Law Firm, P.C.

(57) ABSTRACT

Disclosed is a 5G or pre-5G communication system to be provided for supporting a data transmission rate higher than that of a 4G communication system such as LTE. Provided is a multilink-based data transmission method by which a data transmission device connected to a plurality of links transmits data, comprising the steps of: generating link state information including information on environments of the plurality of links; receiving link configuration information including information on available links; generating a weight for the plurality of links on the basis of the link state information and the link configuration information; select- (Continued)

ing at least one link from among the plurality of links for which the weight is generated; and transmitting data to the selected at least one link.

11 Claims, 9 Drawing Sheets

(51) Int. Cl.
*H04L 12/721* (2013.01)
*H04W 28/02* (2009.01)
*H04W 76/14* (2018.01)
*H04W 40/02* (2009.01)
*H04W 40/12* (2009.01)
*H04W 40/24* (2009.01)

(52) U.S. Cl.
CPC ............ *H04W 4/46* (2018.02); *H04W 28/02* (2013.01); *H04W 40/02* (2013.01); *H04W 40/12* (2013.01); *H04W 40/24* (2013.01); *H04W 76/14* (2018.02)

(56) References Cited

U.S. PATENT DOCUMENTS

| | | | | |
|---|---|---|---|---|
| 2008/0013502 A1* | 1/2008 | Clark | ................... | G08C 17/00 370/338 |
| 2008/0267116 A1* | 10/2008 | Kang | ................... | H04L 45/20 370/328 |
| 2010/0074194 A1* | 3/2010 | Liu | ................... | H04W 40/12 370/329 |
| 2010/0128638 A1* | 5/2010 | Navas | ................ | G06F 16/2255 370/254 |
| 2011/0317587 A1* | 12/2011 | Lida | ................... | H04L 43/0847 370/254 |
| 2013/0028094 A1* | 1/2013 | Gao | ................... | H04L 47/724 370/238 |
| 2013/0094422 A1* | 4/2013 | Thanikachalam | ... | H04B 7/0691 370/312 |
| 2013/0265880 A1* | 10/2013 | Lee | ................... | H04L 43/08 370/235 |
| 2016/0198466 A1 | 7/2016 | Yang et al. | | |

FOREIGN PATENT DOCUMENTS

| | | |
|---|---|---|
| KR | 1020020054449 | 7/2002 |
| KR | 1020070003715 | 1/2007 |
| KR | 1020100029869 | 3/2010 |
| KR | 1020110012830 | 2/2011 |
| WO | WO 00/16511 | 3/2000 |
| WO | WO 2007/086679 | 8/2007 |

OTHER PUBLICATIONS

PCT/ISA/237 Written Opinion issued on PCT/KR2017/010864 (pp. 7).

European Search Report dated Jul. 4, 2019 issued in counterpart application No. 17859955.1-1215, 9 pages.

* cited by examiner

| MESSAGE TYPE | MESSAGE DESCRIPTION | | LATENCY | PRIORITY |
|---|---|---|---|---|
| HIGH LEVEL MESSAGES (LIFE SAFETY) | EMERGENCY IMPACT MITIGATION AND INJURY MITIGATION | CRASH-PENDING NOTIFICATION | <10ms | 7 |
| | EMERGENCY POTENTIAL-EVENT IMPACT AND/OR INJURY MITIGATION | PRE-CRASH | <10ms | 7 |
| | URGENT WARNING EVENT | HARD-BRAKE REQUIRED | <10ms | 7 |
| | PERIODIC PUBLIC SAFETY STATUS INFORMATION | BASIC SAFETY | 10~20ms | 5 |
| | URGENT WARNING OF IMPENDING LOCAL SITUATION | EMERGENCY VEHICLE ALERT | 10~20ms | 5 |
| MEDIUM LEVEL MESSAGES (PUBLIC SAFETY) | URGENT PUBLIC SAFETY DOWNLOAD | TRAFFIC SIGNAL PHASE AND TIMING | <10ms | 6 |
| | PUBLIC SAFETY DATA TRANSACTION AND EXCHANGES | ELECTRONIC TOLL COLLECTION | <10ms | 6 |
| | SEMI-URGENT PUBLIC SAFETY LINK ESTABLISHMENT | LANE COOPERATION | 10~20ms | 4 |
| LOW LEVEL MESSAGES (PRIVATE INFORMATION) | URGENT PRIVATE MOBILE MESSAGE | ON-BOARD NAVIGATION REROUTE INSTRUCTION | <10ms | 2 |
| | URGENT PRIVATE AND COMMERCIAL ELECTRONIC TRANSACTIONS | ELECTRONIC PAYMENT | <10ms | 2 |
| | PRIVATE MOBILITY DATA DOWNLOADS AND UPGRADES | AREA MAP OR DATABASE DOWNLOAD OR UPGRADE | >20ms | 1 |

METHOD AND DEVICE FOR TRANSMITTING DATA OVER A SELECTED LINK IN MULTILINK ENVIRONMENT

PRIORITY

This application is a National Phase Entry of International Application No. PCT/KR2017/010864, which was filed on Sep. 28, 2017, and claims priority to Korean Patent Application No. 10-2016-0130899, which was filed on Oct. 10, 2016, the content of each of which are incorporated herein by reference.

TECHNICAL FIELD

The disclosure relates to a data transmission method and device, and more specifically, to a data transmission method and device for a user equipment selects a transmission path in a wireless communication system and transmit data based on the selected transmission path.

BACKGROUND ART

In order to meet the demand for wireless data traffic, which has soared since 4G communication systems came to the market, there have been ongoing efforts to develop enhanced 5G communication systems or pre-5G communication systems. For these reasons, 5G communication systems or pre-5G communication systems are called the beyond 4G network communication system or post LTE system.

For higher data transmit rates, implementing 5G communication systems on ultra-high frequency bands (mmWave), such as, e.g., 60 GHz, is being considered. To mitigate pathloss on the ultra-high frequency band and increase the reach of radio waves, the following techniques are taken into account for 5G communication systems: beamforming, massive multi-input multi-output (MIMO), full dimensional MIMO (FD-MIMO), array antennas, analog beamforming, and large scale antennas.

Various technologies for 5G communication systems to have an enhanced network are also being developed, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation.

There are also other various schemes under development for 5G systems including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The advent of smartphones has led to a sharp increase in data traffic. As the population of people using smartphones and application services through smartphones is likely to sharply increase, mobile data traffic is anticipated to increase even more. In particular, if intelligent communication utilizing things comes into play, such as communication between human beings and things or inter-thing communication, which is regarded as a brand-knew market that is beyond communication between human beings, traffic forwarded to base stations may increase to an extent difficult for them to handle.

The growth of network technology is leading to wide use of terminals such as smartphones and laptop computers with one or more radio links. A terminal may access various radio links, e.g., a wireless communication system or Wi-Fi, to receive services. Required in such an environment is efficient use of multiple networks considering one or more radio links, the state of the terminal, and the type of data to be transmitted.

According to the present invention, there is provided a method for selecting the optimal path, i.e., the optimal radio link, for efficient data transmission from among a plurality of radio links and transmitting data via the selected radio link.

DETAILED DESCRIPTION OF THE INVENTION

Technical Problem

According to the disclosure, there is provided a data transmission method and device in a multi-link environment to efficiently transmit messages or data.

According to the disclosure, there is provided a data transmission method and device in a multi-link environment to select the optimal transmission path for efficient transmission of messages or data.

According to the disclosure, there is provided a data transmission method and device in a multi-link environment to select the optimal data path considering link state information, link configuration information, and additional information targeting UEs with one or more radio links.

According to the disclosure, there is provided a method and device in a multi-link environment to change or replace a selected data transmission path depending on the type of message, the type of service being provided, and the characteristics of data.

According to the disclosure, there is provided a data transmission method and device in a multi-link environment to use a plurality of radio links properly in an interchangeable manner depending on vehicle information and surrounding context information in vehicle-to-vehicle (V2V) wireless communication.

Technical Solution

According to the disclosure, there is provided a method for transmitting data on a multi-link basis by a communication device connected to a plurality of links, the method comprising generating link state information including information about an environment of the plurality of links, receiving link configuration information including information about an available link, generating weights for the plurality of links based on the link state information and the link configuration information, selecting at least one link from among the plurality of links for which the weight are generated, and transmitting data via the at least one link selected.

According to the disclosure, there is provided a method for transmitting data on a multi-link basis by a data transmission device connected to a plurality of links, the method comprising generating link state information including information about an environment of the plurality of links and link configuration information including information about an available link, generating weights for the plurality of links based on the link state information and the link configuration information, selecting at least one link from among a plurality of links for which the weight are generated, and transmitting data via the at least one link selected.

According to the disclosure, there is provided a device configured to transmit data on a multi-link basis via a plurality of links, comprising a receiver configured to receive link configuration information including information about an available link, a controller configured to generate link state information including information about an environment of the plurality of links, generate weights for the plurality of links based on the link state information and the link configuration information, and select at least one link from among the plurality of links for which the weights are generated, and a transmitter configured to transmit data via the at least one link selected.

According to the disclosure, there is provided a device configured to transmit data on a multi-link basis via a plurality of links, comprising a controller configured to generate link state information including information about an environment of the plurality of links and link configuration information including information about an available link, generate weights for the plurality of links based on the link state information and the link configuration information, select at least one link from among the plurality of links for which the weights are generated, and transmit data via the at least one link selected and a transmitter configured to transmit the data via the at least one link selected.

Advantageous Effects

According to the disclosure, the optimal path for message transmission may be selected, ensuring efficient data transmission.

According to the disclosure, the optimal path for message transmission may be selected, allowing for efficient use of wireless network resources.

According to the disclosure, a data transmission path may be selected depending on the type of service being provided, the type of message, data characteristics, link state, and link configuration, enabling context-adaptive data transmission.

According to the disclosure, a proper link may be selected reflecting the demand of a link user, providing a customer-friendly link service.

According to the disclosure, requirements for public message transmission may be met in data transmission, ensuring private or public safety and social order against various dangerous circumstances.

MODE FOR CARRYING OUT THE INVENTION

Hereinafter, embodiments of the present invention are described in detail with reference to the accompanying drawings. The same reference denotations may be used to refer to the same or similar elements throughout the specification and the drawings. When making the gist of the present invention unclear, the detailed description of known functions or configurations is skipped. The terms as used herein are defined considering the functions in the present invention and may be replaced with other terms according to the intention or practice of the user or operator. Therefore, the terms should be defined based on the overall disclosure.

The description of the disclosure primarily focuses on LTE and D2D communications that have been standardized by the 3rd generation partnership project (3GPP), but the gist of the disclosure may also be applicable to other communication systems with a similar technical background by making slight changes thereto without significantly departing from the scope of the disclosure, which suggest examples of interpretation of some terms used herein. However, it should be noted that the disclosure is not limited thereto.

The base station (BS) is an entity communicating with a UE and may be denoted a nodeB (NB), eNodeB (eNB), NR NodeB (gNB), or access point (AP).

The mobile station (MS) is an entity communicating with a base station and may be denoted user equipment (UE), mobile equipment (ME), device, or terminal.

Figure 1:
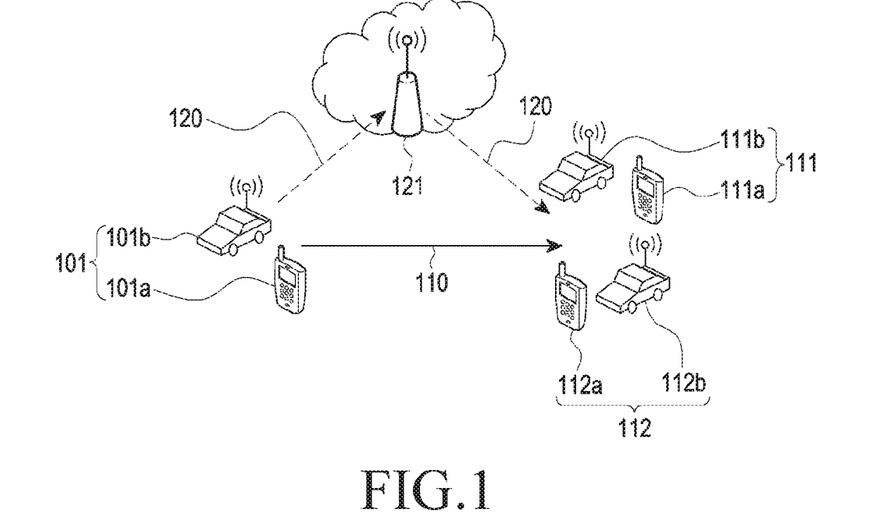
FIG. 1 is a view illustrating an example of data transmission using a direct link among one or more multiple links according to the disclosure.

FIG. 1 is a view illustrating an example of data transmission using a direct link among one or more multiple links according to the disclosure.

According to the present invention, there is disclosed a UE to receive link state information to select the optimal data transmission path. The UE may select at least one link for data transmission using link state information and transmit data through the selected link.

Referring to FIG. 1, the UE communicates with other UEs via one or more radio links. Although no limitation is imposed on the one or more radio links, FIG. 1 illustrates an example in which the UE performs communication using a direct link 110 and a network link 120.

A first UE 101 may use both the direct link 110 and the network link 120. To communicate with a second UE 111 or 112, the first UE 101 may use the direct link 110 or the network link 120. When the first UE 101 is available for both the proximity-based services (ProSe) link for inter-device direct communication and the LTE link (or NR link) as specified by the 3GPP, the direct link 110 may be a ProSe link, and the network link 120 may be an LTE link or evolved universal terrestrial radio access network (E-UTRAN) link (or NR link). As an example, a PC5 interface may be used for the ProSe link, and an LTE-Uu may be used for the LTE link, as a data transmission interface between UE and base station. When an NR link is used, a Uu may be used as a data transmission interface between UE and base station. Referring to FIG. 1, the first UE 101 may communicate with the second UE 111 or 112 via the direct link 110.

The UE may typically be user equipment 101a, 111a, or 112a, e.g., the user's mobile device, but when the multi-link environment is implemented in vehicle-to-vehicle (V2V) communication, the UE may be a vehicle 101b, 111b, or 112b. Hereinafter, vehicle-to-vehicle may be simply referred to as "V2V," and message exchanged between vehicles may be referred to as a "V2V message."

When the first UE 101 performs communication via the direct link 110, i.e., a ProSe link, the first UE 101 may receive or generate link state information containing the data load and resource block of a PC5 interface. The first UE 101 may manage the link state information about the direct link 110.

Figure 2:
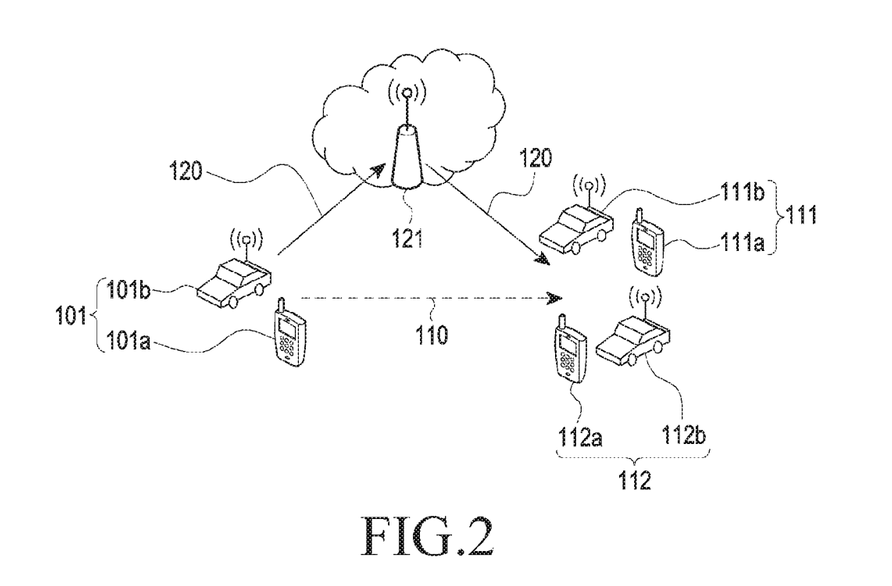
FIG. 2 is a view illustrating an example of data transmission using a network link among one or more multiple links according to the disclosure.

FIG. 2 is a view illustrating an example of data transmission using a network link among one or more multiple links according to the disclosure.

Referring to FIG. 2, the first UE 101 may communicate with the second UE 111 or 112 via the network link 120, e.g., an LTE link, instead of the direct link 110.

When the first UE 101 communicates via the LTE link, i.e., the network link 120, the first UE 101 may receive via the network, or may internally generate, link state information containing LTE-Uu interface data load and resource block information. The first UE 101 may manage the link state information about the network link 120.

Figure 3:
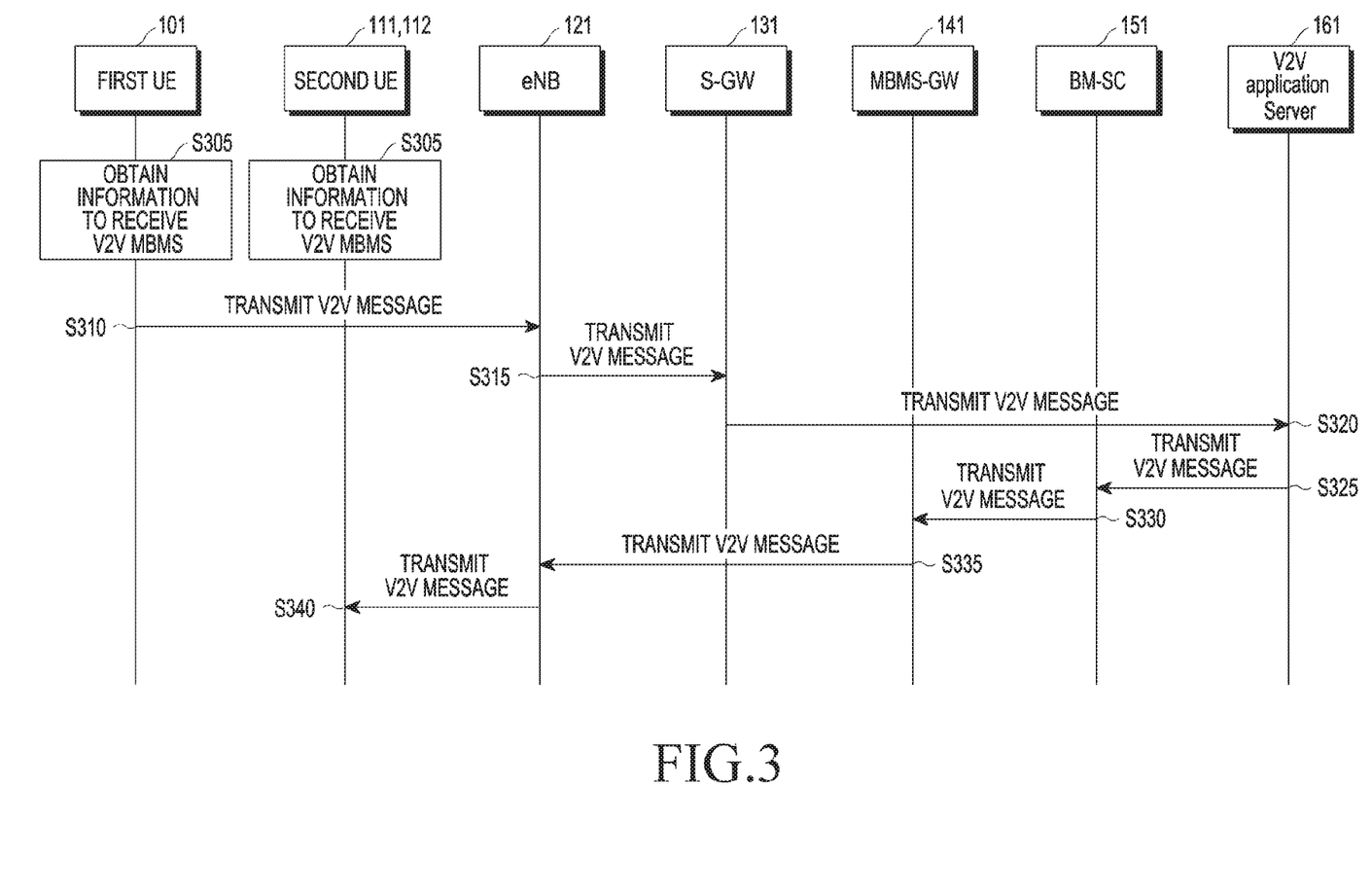
FIG. 3 is a view illustrating an example of data transmission using an E-UTRAN link among one or more multiple links according to the disclosure.

FIG. 3 is a view illustrating an example of data transmission using an E-UTRAN link among one or more multiple links according to the disclosure.

Referring to FIG. 3, for the first UE 101 to communicate with the second UE 111 or 112 via the network link 120, the first UE 101 and the second UE 111 or 112 may obtain information for receiving V2V multimedia broadcast/multicast service (MBMS) (S305). The first UE 101 may transmit a V2V message to an eNB 121 (S310). The eNB 121 may receive the V2V message and transmit the V2V message to a serving-gateway (S-GW) (S315). The S-GW 131 may transmit the V2V message through an MBMS-gateway (GW) and a broadcast/multicast service center (BM-SC) to a V2V application server (S320). The V2V application server may transmit the V2V message to the BM-SC (S325), and the BM-SC may transmit the V2V message to the MBMS-GW (S330). The MBMS-GW may transmit the V2V message to the eNB (S335), and the eNB may transmit the V2V message to the second UE 111 or 112 (S340). The first UE 101 may transmit the V2V message via the LTE link to the second UE 111 or 112.

Figure 4:
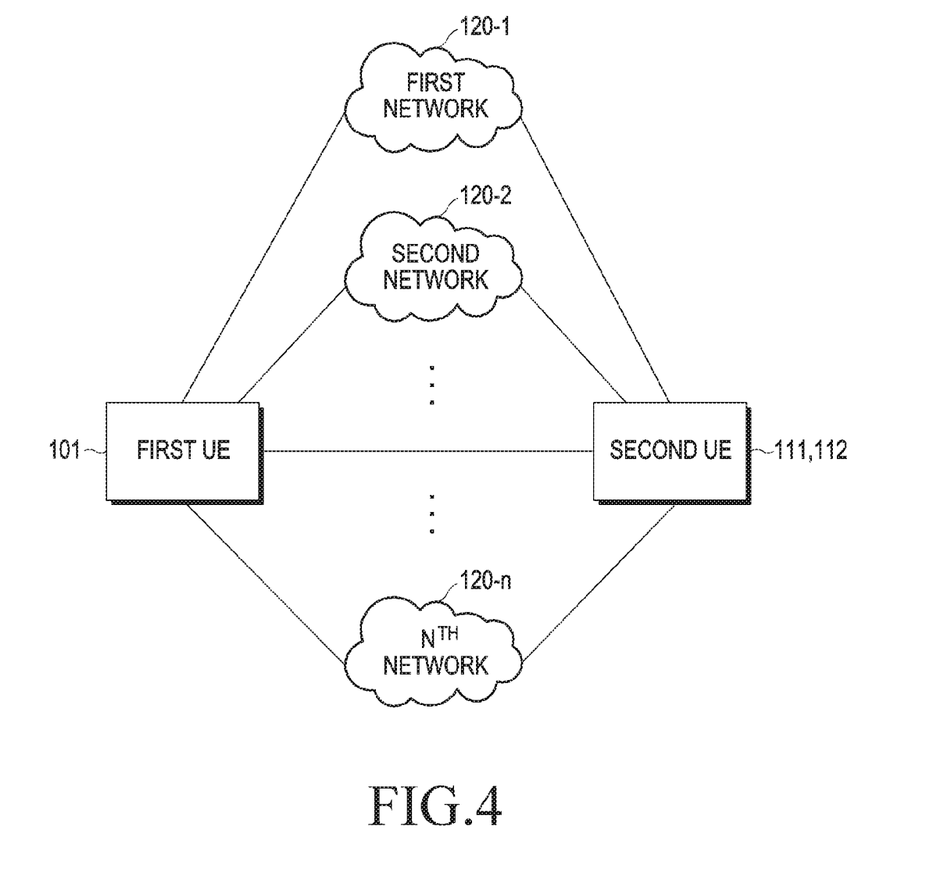
FIG. 4 is a view schematically illustrating an example of a multi-link environment according to the disclosure.

FIG. 4 is a view schematically illustrating an example of a multi-link environment according to the disclosure.

Referring to FIG. 4, a data transmission system in a multi-link environment includes a first UE 101 constituting a transmit terminal, a second UE 111 or 112 constituting a receive terminal, and multiple links. The multiple links may come in a type of passing through a network such as LTE links and a direct UE-to-UE type such as ProSe links. In this disclosure, the former is shown as a plurality of networks such as a first network 120-1, a second network 120-2, ..., an nth network, and the latter is shown as a direct link 110.

The multiple links are preferably radio links, but not limited thereto, may be wired links and/or radio links.

Figure 5:
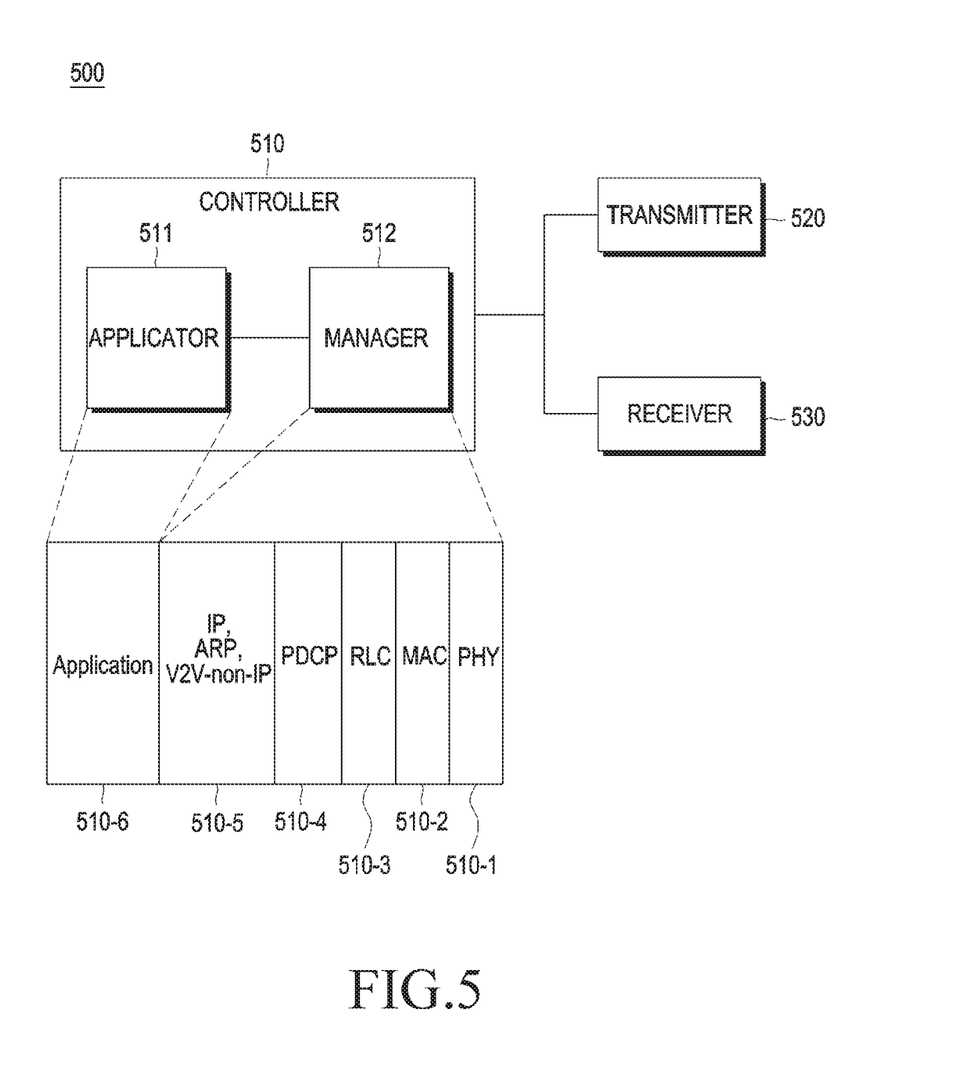
FIG. 5 is a view schematically illustrating a detailed configuration of a data transmission device in a multi-link environment according to the disclosure.

FIG. 5 is a view schematically illustrating a detailed configuration of a data transmission device in a multi-link environment according to the disclosure.

Referring to FIG. 5, a data transmission device 500 in a multi-link environment includes a controller 510, a transmitter 520, and a receiver 530 and connects to a direct link or network. The data transmission device 500 may be the above-described first UE 101 and/or second UE 111 or 112.

The controller 510 may process various pieces of information and select a link for the optimal data transmission depending on the processed information. The controller 510 may generate link state information containing information about the multi-link environment and link configuration information containing information about available links. The link state information and the link configuration information may previously be stored and managed by the controller 510. When the data transmission device 500 is connected with a network, the link state information and link configuration information may be received from the network.

The link state information may contain all information about the link connected to the data transmission device 500. The link state information may indicate the state of the link currently connected. In the case of the direct link 110, the link state information may be information about the load, traffic, allowed signal characteristics, and resource block about the ProSe link. In the case of the network link 120, the link state information may be information about the load, traffic, allowed signal characteristics, allowed service (slice/service type) characteristics, and resource block about the LTE link. The link state information may be processed information such as for interface load, traffic, allowed signal characteristics, and resource block. For example, the processed information may a link congestion level calculated for each link. The link state information may be received from the link. Preferably, the link state information may previously be stored and managed by the data transmission device 500.

The link configuration information is information regarding the internal configuration of the data transmission device 500 in relation to the multiple links connected. The link configuration information may indicate whether the data transmission device 500 may make use of the multiple links currently connected. Preferably, the link configuration information may contain link activation information. In a multi-link environment with the direct link 110 and the network link 120, the link configuration information may contain information about PC5 interface enable/disable of the direct link 100 and LTE-Uu enable/disable of the network link 120.

The controller 510 may make a configuration on whether a link is available in the multi-link environment. In a first method for the controller 510 to configure whether a link is available, when the data transmission device 500 accesses a plurality of networks, each of the plurality of networks may notify the controller 510 whether it is available. In other words, the controller 510 may receive link configuration information form the link. As a second method for the controller 510 to make a configuration about whether a link is available, the controller 510 may be pre-configured for whether each link is available. When the data transmission device 500 is connected to a ProSe link and LTE link which are D2D links specified by the 3GPP, the data transmission device 500 may internally be preset to use both links or only one of them. That is, the controller 510 may generate link configuration information on its own and use the link configuration information to select a data transmission path.

The controller 510 generates weights for the plurality of links based on the link state information and the link configuration information. The weights may be a standard to select at least one, as the data transmission path, from among the multiple available links. The controller 510 may include a weight calculation algorithm and determine a default weight for each link. When the controller 510 determines a certain link as the data transmission path, the controller 510 may assign a high default weight to the link. Accordingly, the controller 510 may transmit data through the link which has been assigned with the high default weight. Typically, the controller 510 may determine a higher default weight as a standard to select a link, but embodiments of the disclosure are not necessarily limited thereto. For example, the controller 510 may select a particular link as the data transmission path in ascending order of default weight. The controller 510 may select a plurality of links, and the weights determined for the plurality of links may be the same or different from each other. In this case, the controller 510 may select the plurality of links based on whether the default weights exceed a threshold. No limitation is imposed on methods as to how the controller 510 selects a link based on the default weight.

For the link selected as the data transmission path, the controller 510 may vary the default weight by additional information, selecting a different data transmission path.

The additional information may contain at least one of data characteristics, message type and/or service type, and network slice type. The additional information means all information required to be taken into consideration to select the optimal data path upon data transmission by the data transmission device 500. Basically, the controller 510 may generate a default weight based on link state information and link configuration information, select at least one from among multiple links based on the generated default weight, and transmit data through at least one link selected. Besides, the controller 510 may select the optimal data transmission path considering other additional factors, e.g., the additional information, that may affect the efficiency of data transmission and transmit data. The controller 510 may generate a weight variation considering the additional information in addition to the default weight generated based on the link state information and link configuration information and transmit data via at least link as per the weight variation.

The message type information is information to indicate the type or content of a message to be transmitted in data. The message type may be differentiated by the degree of emergency of the message, message transmission periodicity, or message transmission entity (e.g., a private or public organization). The messages of the message type information may include emergency messages or normal messages depending on the degree of emergency, periodic messages or aperiodic messages depending on the message transmission periodicity, and private messages or public messages depending on transmission entities.

The service type information is information about the service that is provided to the data transmission device 500. The service type information may contain what specifies the traits or type of data to be transmitted. The services of the service type information are differentiated by service purposes or contents. The services may include emergency services (e.g., a disaster notification service) or normal services depending on service purposes and voice services, text services, or image services depending on service contents.

The network slice type information is information about network slice types that may support the service that the user intends to use. The network slice types may include broadband networks (eMBB), networks (IoT) for small terminals, e.g., sensors, and networks (URLLC) for emergency services, depending on the type of services supported.

The data characteristic information may include transmission quantity information about the amount of data transmitted, transmission area information about the area where data is transmitted, and/or transmission range information about the distance that data transmission reaches. The data characteristic information is not limited thereto, but may instead include all information to specify the traits of data.

The controller 510 may vary the default weight depending on the service type. Basically, the controller 510 may assign a lower default weight to the LTE link and a higher default weight to the ProSe link, selecting the ProSe link as the data path. When the data transmission device 500 receives a voice service, and data to be transmitted is voice data, the controller 510 may generate a weight variation by reflecting service type information-containing additional information to the default weight. The weight variation may mean adjusting the lower weight of the LTE link to be higher and the higher weight of the ProSe link to be lower. The controller 510 may transmit voice data through the LTE link of which the weight has been adjusted to be higher by the weight variation.

The weight adjustment for selecting a data path may be carried out by the link state information or link configuration information as well as by the additional information. Although a higher default weight has been assigned to the ProSe link, if the ProSe link is busy, the default weight of the ProSe link may be decreased.

Despite the same service types, the controller 510 may adjust the default weight depending on message types. Data transmission via the ProSe link may be faster than data transmission via the LTE link. It is preferable to perform data transmission via the ProSe link when a short transmission time (latency) is required, and otherwise, via the LTE link. Although a lower default weight has been assigned to the ProSe link, when an emergency message is to be transmitted due to an accident, the controller 510 may increase the default weight of the ProSe link and transmit the emergency message through the ProSe link. For periodical messages, the controller 510 may decrease the default weight of the ProSe link and transmit periodic state messages through a different link, e.g., LTE link. Thus, when an accident occurs, the data transmission device 500 may transmit emergency messages first via the ProSe link.

The weight variation generated by the controller 510 given additional information as well as the default weight may be expressed in Equations below.

$$LTE_w = f_{cal}(LTE_{dw}, +\text{factor}, -\text{factor}) \quad \text{[Equation 1]}$$

$$ProSe_w = f_{cal}(ProSe_{dw}, +\text{factor}, -\text{factor}) \quad \text{[Equation 2]}$$

Equation 1 represents a function to yield the $LTE_w$ of the LTE link using, as inputs, the default weight $LTE_{dw}$ of the LTE link and additional information factor. Equation 2 represents a function to yield the weight variation $ProSe_w$ of the ProSe link using, as inputs, the default weight $ProSe_{dw}$ of the ProSe link and additional information factor.

The controller 510 may generate a message to be transmitted. The generated message data is transmitted through a link selected by the above-described data transmission path selection mechanism. The controller 510 transmits the generated message via the data transmission path selected corresponding to the default weight. The controller 510 may change the data transmission path corresponding to the weight variation and transmit data via the variation data transmission path.

The controller 510 may generate quality-of-service (QoS) information and select at least one link meeting the QoS information from among the multiple links. The controller 510 may transmit data for the message to be transmitted via the QoS-met link.

When at least one link selected is unavailable, the controller 510 reselects a replacement link to replace the at least one link selected from among the multiple links. When a plurality of links are selected from among the multiple links, and any one thereof is unavailable, the controller 510 transmits data via another one of the plurality of links. Upon reselecting a replacement link or changing the link to another selected link, the controller 510 may not consider the default weight nor does the controller weight variation generation.

The controller 510 may include an applicator 511 and a manager 512. According to the disclosure, the selection of a data transmission path may be performed by the applicator 511 or the manager 512.

The applicator 511 generates a message to be transmitted and selects a path for message transmission. The applicator 511 transfers the generated message through the manager 512 to the transmitter 520. Specifically, the applicator 511 generates weights for multiple links based on link state information, link configuration information, and additional information, selects at least one of the multiple links for which weights have been generated, and controls the transmitter 520 to transmit data via the at least one link selected.

The manager 512 manages the link state information, link configuration information, and additional information. The manager 512 may receive from the connected link, or generate on its own, the link state information, link configuration information, and additional information. Preferably, the manager 512 may be previously set as to whether the link is available and generate the link configuration information based thereupon. The manager 512 transfers the link state information, link configuration information, and additional information to the applicator 511, and the applicator 511 selects a data transmission path based thereupon.

When some of the links selected by the applicator 511 are unavailable, the manager 512 may transmit data via another available link as selected or a replacement link.

The manager 512 may select a data transmission path instead of the applicator 511. Specifically, the manager 512 may generate weights for multiple links based on link state information, link configuration information, and additional information, select at least one of the multiple links for which weights have been generated, and control the transmitter 520 to transmit data via the at least one link selected.

The applicator 511 may generate QoS information for QoS requirements that need to be met. Instead of weight-based link selection, the applicator 511 may select a link meeting the QoS requirements as the data transmission path, and messages are transmitted via the link. The operation of selecting a link that meets the QoS requirements as the data transmission path may be performed by the manager 512 on behalf of the manager 512.

The controller 510 may correspond, among network layers, a physical layer (PHY) 510-1, a medium access control (MAC) layer 510-2, a radio link control (RLC) layer 510-3, a packet data convergence protocol (PDCP) layer 510-4, and an internet relay (IR)□address resolution protocol (ARP) □vehicle-to-vehicle non-internet protocol (V2V-non-IP) layer (hereinafter, "IP layer") 510-5, and an application layer 510-6. Preferably, the applicator 511 may correspond to, but is not limited to, an application layer, and the manager 512 may correspond to, but is not limited to, a PHY layer, an MAC layer, an RLC layer, a PDCP layer, and an IP layer.

The controller 511 may select a data path for message transmission according to various standards (e.g., message type, data size, priority, or density of the transmission entity) of the application layer. When the data transmission device 500 applies V2V communication, the controller 511 may select a data path according to various standards of the application layer, i.e., V2V communication-intended message type, data size, priority, or density of transmission entity (e.g., the number of UEs per unit communication area).

The transmitter 520 may send message data via the selected data transmission path to another entity.

When the data transmission device 500 is connected via the network to the link, the receiver 530 may receive at least one of link state information, link configuration information, and additional information necessary for selection of a data transmission path from the link.

Figure 6:
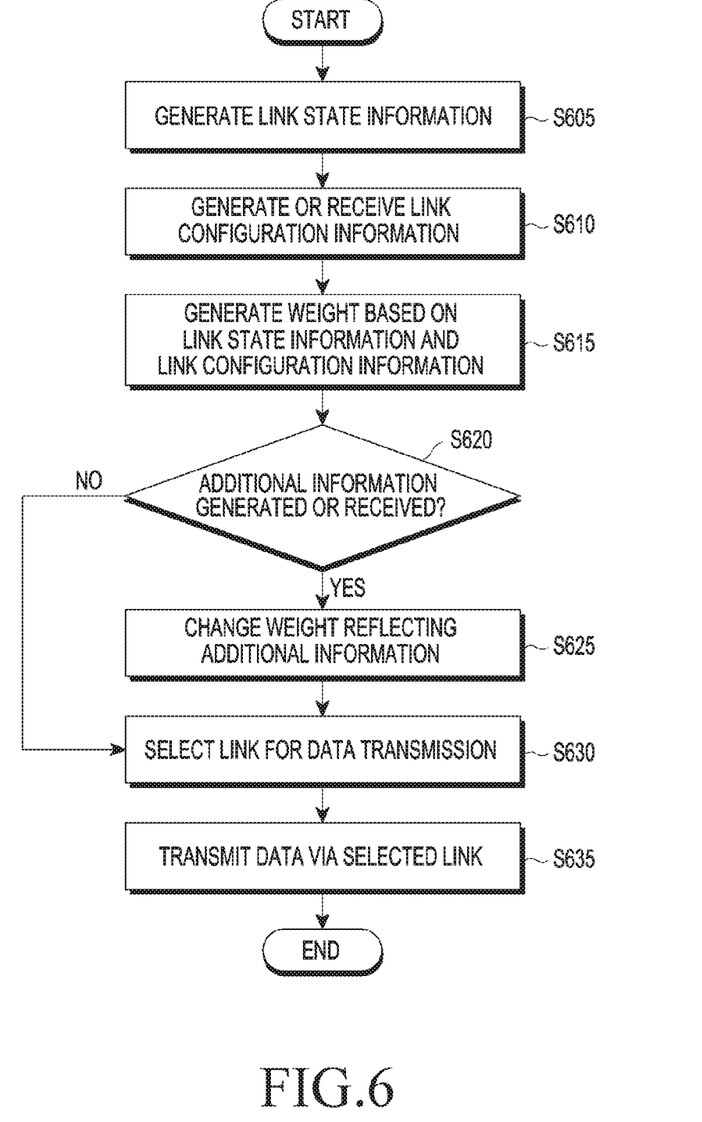
FIG. 6 is a flowchart illustrating operations of a data transmission device in a multi-link environment where a weight is varied according to the disclosure.

FIG. 6 is a flowchart illustrating operations of a data transmission device in a multi-link environment in which weight is varied according to the disclosure.

The manager 512 may generate link state information (S605). Without being limited thereto, the link state information may be received from the receiver 530 via an external network link.

The manager 512 may receive the link configuration information transmitted from the link from the receiver 530 or may generate link configuration information based on a preset link configuration (S610).

The applicator 511 may generate a weight (default weight) for each link based on the link state information and link configuration information (S615).

The applicator 511 may determine whether additional information is generated or received from the link (S620).

When the additional information is generated or received from the link, the applicator 511 may change the weight for each link by reflecting the additional information (S625). The applicator 511 may select at least one link for data transmission based on the weight variation (S630). This operation may also be performed by the manager 512.

Unless the additional information is generated or received from the link, the applicator 511 may select at least one link for data transmission based on the default weight without considering the additional information (S630). This operation may also be performed by the manager 512.

The transmitter 520 may receive a command for transmission via the selected link from the applicator 511 or manager 512 and transmit data via the selected link (S635).

Figure 7:
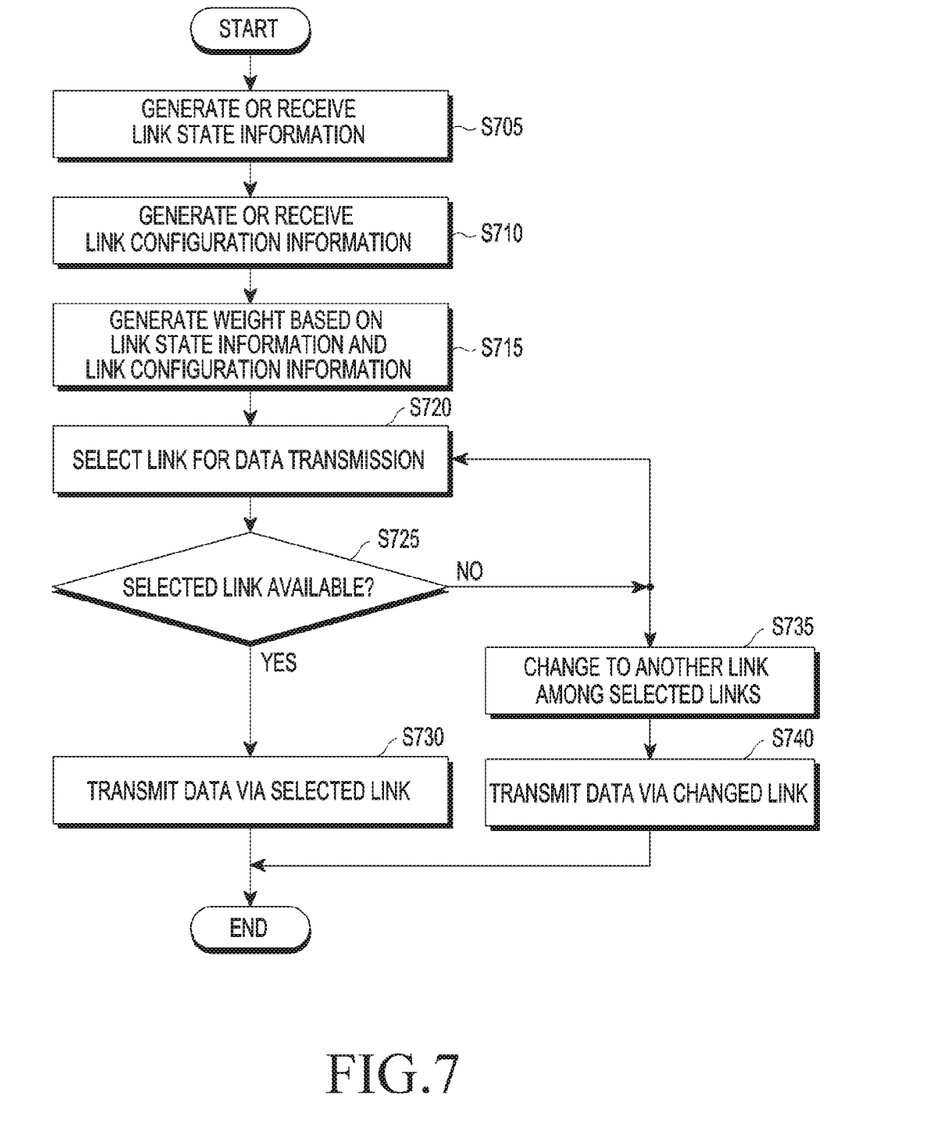
FIG. 7 is a flowchart illustrating operations of a data transmission device in a multi-link environment where a selected link is unavailable according to the disclosure.

FIG. 7 is a flowchart illustrating operations of a data transmission device in a multi-link environment in which a selected link is unavailable according to the disclosure.

The manager 512 may generate link state information (S705). Without being limited thereto, the link state information may be received from the receiver 530 via an external network link.

The manager 512 may receive the link configuration information transmitted from the link from the receiver 530 or may generate link configuration information based on a preset link configuration (S710).

The applicator 511 may generate a weight (default weight) for each link based on the link state information and link configuration information (S715).

The applicator 511 may select a link for data transmission based on the default weight (S720).

The manager 512 may determine whether the selected link is available (S725).

When the selected link is available, the manager 512 may transmit data via the selected link (S730).

When the selected link is unavailable, the manager 512 may disregard the selected link and reselect a new, replacement link (S720). The manager 512 may determine whether a replacement link is available (S725), and if available, transmit data via the replacement link (S730).

When the selected link is unavailable, and there are a plurality of existing links selected, the manager 512 may change the unavailable link to another one of the selected links (S735). The manager 512 may transmit data via the variation link (S740).

Figure 8:
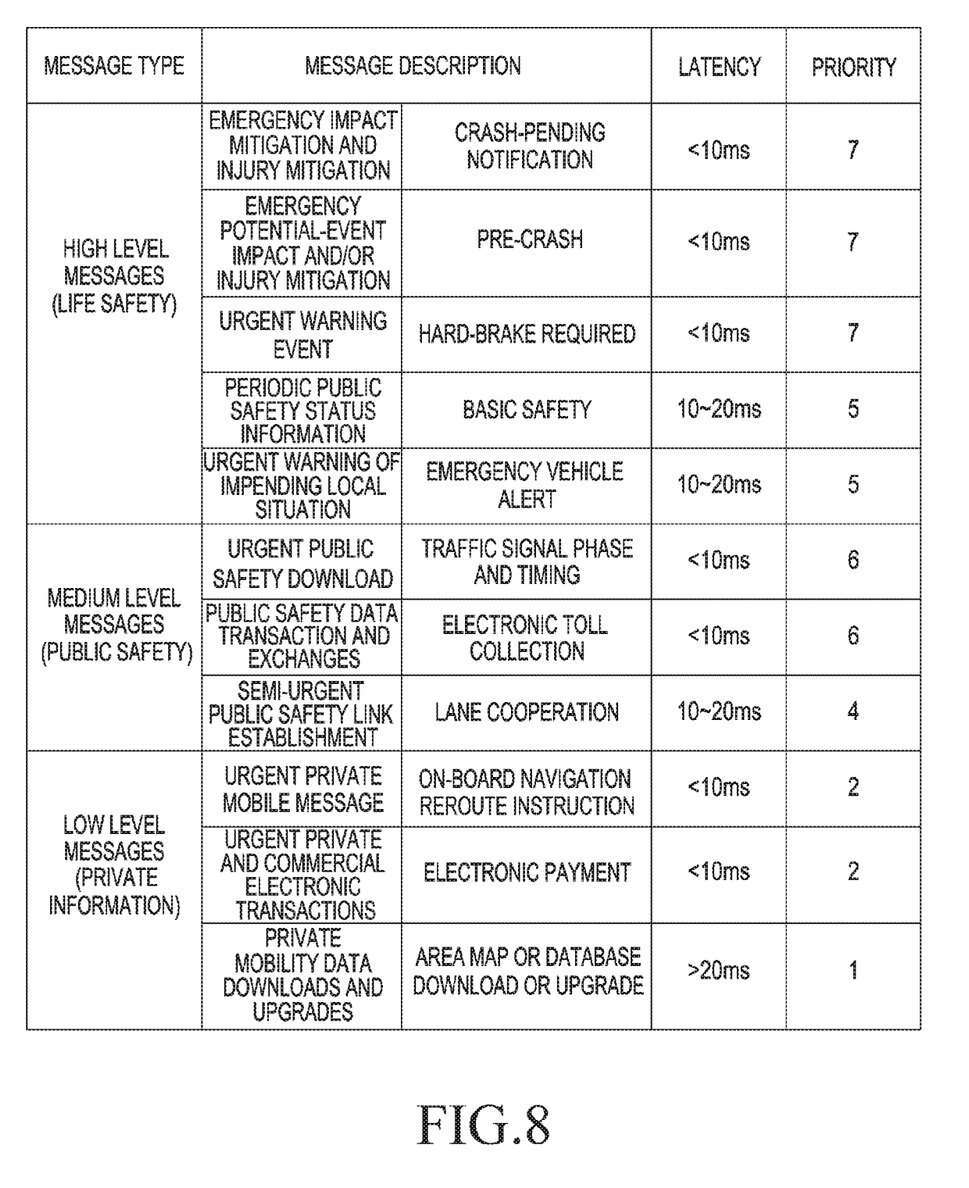
FIG. 8 is a view illustrating an example of a message type to select a data transmission path in a multi-link environment according to the disclosure.

FIG. 8 is a view illustrating an example of a message type to select a data transmission path in a multi-link environment according to the disclosure.

The controller 510 may select other links as per transmission time (latency) required for the message type. Specifically, the controller 510 may reflect additional information containing message type information in generating weights and select a proper one from among the multiple links according to the reflected weights. In this case, the more various message types are contained in the message type information, the more various links may be selected.

Referring to FIG. 8, three message types for selecting a data transmission path are shown. The three message types may include a high level message, a medium level message, or a low level message depending on the importance of the message.

The high level message may be a message related to life safety and come in five types depending on the emergency. High level messages may include emergency impact mitigation and injury mitigation messages, emergency potential-event impact and/or injury mitigation messages, urgent warning event messages, periodic public safety status information messages, and urgent warning of impending local situation messages.

When used for a wireless communication system for driving vehicles, the emergency impact mitigation and injury mitigation messages may contain a description of crash-pending notifications. The emergency potential-event impact and/or injury mitigation messages may contain a description of pre-crash vehicles. The urgent warning event messages may contain a description of the hard-brake. The periodic public safety status information messages may contain a description of transmission and reception of messages regarding basic vehicular safety. The urgent warning of impending local situation messages may contain a description of emergency vehicle alerts. The emergency impact mitigation and injury mitigation messages, emergency potential-event impact and/or injury mitigation messages, and urgent warning event messages are required to be transmitted within a transmission time (latency) less than 10 ms and may have a priority of 7 which is the highest compared to the other messages. The periodic public safety status information messages and urgent warning of impending local situation messages may be transmitted within a transmission time ranging from 10 ms to 20 ms, with a priority of 5.

The medium level message may be a message related to public safety and come in three types depending on the emergency. Medium level messages may include urgent public safety download messages, public safety data transaction and exchanges messages, and semi-urgent public safety link establishment messages.

When used for a wireless communication system for driving vehicles, the urgent public safety download messages may contain a description of the traffic signal phase and timing. The public safety data transaction and exchanges messages may contain a description of electronic toll collections. The semi-urgent public safety link establishment messages may contain a description of lane cooperation. The urgent public safety download messages and public safety data transaction and exchanges messages may be required to be transmitted within a transmission time (latency) less than 10 ms and have a priority of 6. The semi-urgent public safety link establishment messages may be transmitted within a transmission time ranging from 10 ms to 20 ms, with a priority of 4.

The low level message may be a message related to private safety and come in three types depending on the emergency. Low level messages may include urgent private mobile messages, urgent private and commercial electronic transactions messages, and private mobility data downloads and upgrades messages.

When used for a wireless communication system for driving vehicles, the urgent private mobile messages may contain a description of on-board navigation reroute instructions. The urgent private and commercial electronic transactions messages may contain a description of electronic payments. The private mobility data downloads and upgrades messages may contain a description of the area map or database download or upgrade. The urgent private mobile messages and urgent private and commercial electronic transactions messages may be required to be transmitted within a transmission time less than 10 ms and have a priority of 2. The private mobility data downloads and upgrades messages may be transmitted within a transmission time exceeding 20 ms with a priority of 1.

In selecting a data transmission path, when a short transmission time is required, the controller 510 may select a link enabling quick communication, and unless a short transmission time is required, select other links. Preferably, to transmit messages required to be transmitted within less than 20 ms, the controller 510 may select the direct link 110, e.g., D2D, and to transmit messages required to be transmitted within 20 ms or more, the controller 510 may select the network link 120, e.g., LTE.

Messages requiring a short transmission time may have a higher priority on transmission. For example, emergency impact mitigation and injury mitigation messages of which the priority is 7 are critical and emergent messages and thus are required to be transmitted preferably within 10 ms, i.e., a short transmission time. As such, the controller 510 may select a data transmission link based on the priority of the message instead of the transmission time of the message.

Figure 9:
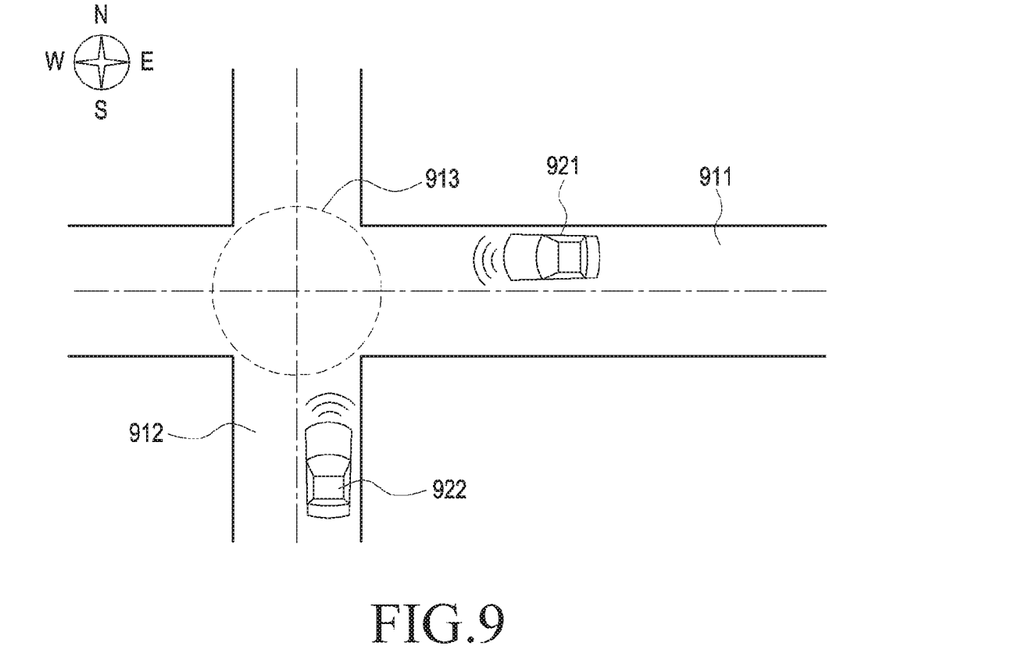
FIG. 9 is a view illustrating an example of a scenario case to select a data transmission path by a message type according to the disclosure.

FIG. 9 is a view illustrating an example of a scenario case to select a data transmission path by a message type according to the disclosure.

FIG. 9 illustrates a scenario case when emergency potential-event impact and/or injury mitigation messages indicating 'pre-crash' among the types of messages disclosed in connection with FIG. 8 may be transmitted.

While a first vehicle 921 driving westbound on an east-west road 911 and a second vehicle 922 northbound on a north-south road 912, they are about to enter an intersection 913. The drivers of the first vehicle 921 and second vehicle 922 may fail to notice each other, thus crashing in the intersection 913. In this case, the first vehicle 921 or second vehicle 922 may send an alert message indicating pre-crash to the other regardless of how the current situation of pre-crash is recognized. Assuming that the maximum transmission time of a pre-crash alert message is 50 ms, the first vehicle 921 or the second vehicle 922 may choose a proper link and send the pre-crash alert message to the other vehicle within 50 ms.

Figure 10:
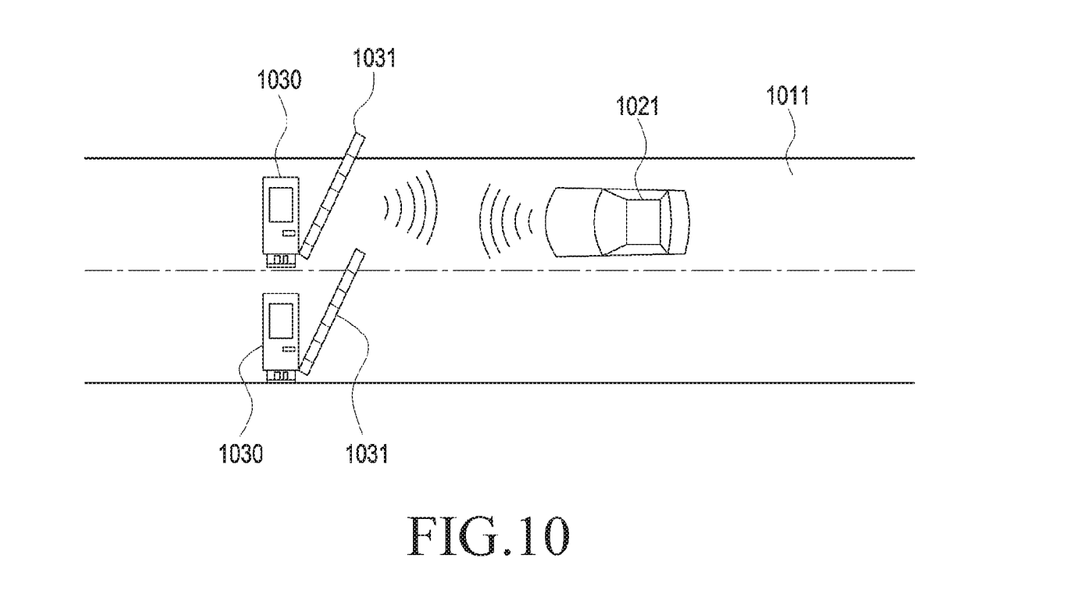
FIG. 10 is a view illustrating another example of a scenario case to select a data transmission path by a message type according to the disclosure.

FIG. 10 is a view illustrating another example of a scenario case to select a data transmission path by a message type according to the disclosure.

FIG. 10 illustrates a scenario case in which a vehicle 1021 traveling on a road 1011 is about to enter a tollgate.

As approaching the tollgate 1030, the vehicle 1021 communicates data with the tollgate 1030. Specifically, the vehicle 1021 may send a barrier open message to the tollgate 1030 to open the tollgate barrier 1031. Assuming that the maximum transmission time between the vehicle 1021 and the tollgate 1030 is 200 ms, the vehicle 1021 may choose a proper link and send a barrier open message to the other entity within 200 ms.

It is also assumed that another vehicle is ahead of the vehicle 1021 entering the tollgate 1012. The vehicle 1021 is required not only to send a barrier open message to the tollgate 1012 but also to send a pre-crash message to the vehicle ahead. In this case, the vehicle 1021 may transmit a pre-crash message, which is required to be transmitted within a relatively short transmission time such as 50 ms, i.e., latency-sensitive, through the direct link 110, e.g., a ProSe link. Conversely, the vehicle 1021 may transmit a barrier open message, which is required to be transmitted within a relatively long transmission time such as 200 ms, i.e., latency-less-sensitive, through the network link 120, e.g., an LTE link.

Figure 11:
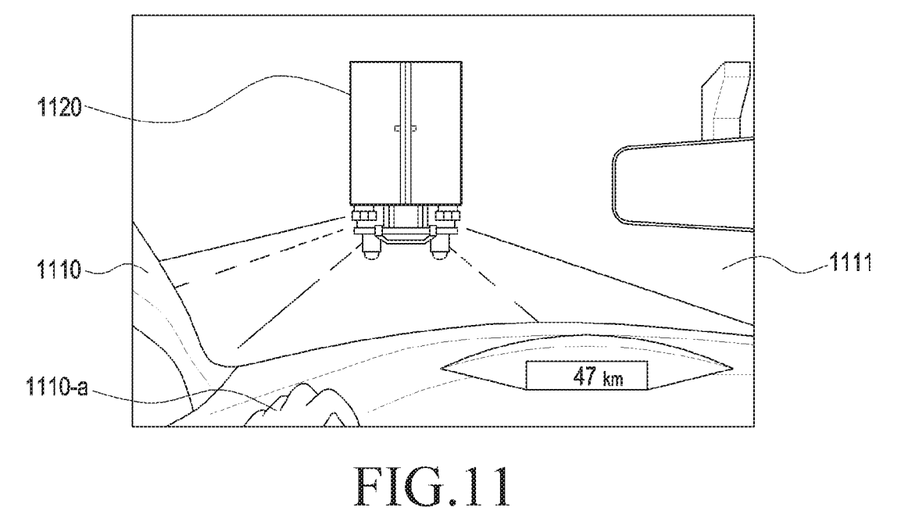
FIGS. 11 and 12 are views illustrating an example of a scenario case to transmit data by data characteristics including the amount of data transmitted according to the disclosure.
Figure 12:
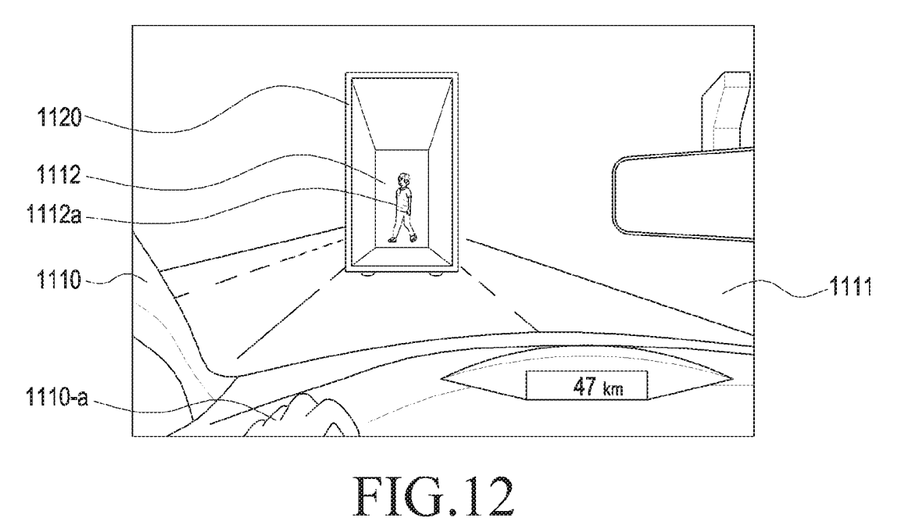

FIGS. 11 and 12 are views illustrating an example of a scenario case to transmit data by data characteristics including the amount of data transmitted according to the disclosure.

FIG. 11 illustrates the appearance of the windshield 1111 of a vehicle before and after data is transmitted via at least one link selected in V2V communication. FIG. 11 illustrates the windshield 1111 of the vehicle 1110 before road condition-related data is transmitted, and FIG. 12 illustrates the windshield 1111 of the vehicle 1110 after road condition-related data is transmitted.

It is hypothesized that the vehicle 1110 follows a truck 1120, and a pedestrian 1112a suddenly tries to cross the road before the truck 1120.

Fortunately, a camera affixed to the truck 1120 may sense this situation and share an image of the pedestrian with the vehicle 1110. The truck 1120 may send out an alert message and a virtual image message to be displayed on the windshield 1111. The image message may contain information about a virtual image 1112 representing what is seen ahead of the truck 1120. The virtual image 1112 may be displayed on the windshield 1111 of the vehicle 1110. The virtual image 1112 displayed on the windshield 1111 may be the same as the scene shown to the driver of the truck 1120, and the vehicle's driver 1110-a may perceive the pedestrian crossing before the truck 1120.

The alert message and the image message may simultaneously require a short transmission time and a high data rate. For example, the alert message and the image message may need a transmission time of 50 ms and a high-capacity data rate of 10 Mbit/s. In this case, the truck 1120 may transmit the alert message via the ProSe link and the image message via the LTE link.

According to the disclosure, the data transmission device 500 may select other links according to data characteristic information including transmission range and transmission area.

As the data transmission range increases, the network link 120 capable of long-range communications may be more advantageous than the direct link 110 featuring short-range communications. In contrast, as the transmission range decreasing, the direct link 110 may work better than the network link 120.

It is assumed based on above that a certain vehicle is driving under the conditions shown in Table 1.

TABLE 1

| Transmission area | Vehicle density (vehicles/km$^2$) | Relative velocity (km/h) | Transmission range (m) |
|---|---|---|---|
| Urban | 1000~3000 | 0~100 | 50~100 |
| Suburban | 500~1000 | 0~200 | 100~200 |
| Highway | 100~500 | 0~500 | 200~1000 |

When a vehicle drives on highway, inter-vehicle distance is long in light of transmission range, causing the presence of another vehicle within the PC5 interface transmission range to be less likely. In terms of vehicle density, the number of vehicles per unit area is small. In a relative velocity sense, a large inter-vehicle velocity gap is shown. It may thus be more advantageous to the vehicle attempting to send data to use the network communication 120, e.g., an LTE link, which is capable of long-range communication, rather than the direct communication 110, e.g., a ProSe link, featuring short-range communication.

When a vehicle drives downtown, inter-vehicle distance is short in light of transmission range, causing the presence of another vehicle within the PC5 interface transmission range to be more likely. In terms of vehicle density, the number of vehicles per unit area is large. In a relative velocity sense, a small inter-vehicle velocity gap is shown. Thus, short-range communication is possible. Preferably, the vehicle to transmit data uses the direct communication 110, e.g., ProSe link, featuring short-range communication, for efficient use of network resources.

The data transmission device 500 sets a link for data transmission considering additional information as well as link state information and link configuration information. The additional information may be considered to be reflected additionally or exclusively. According to the disclosure, the selected link may be changed or replaced with a replacement link by additionally reflecting the additional information. However, without being limited thereto, the selected link may be changed or replaced with a replacement link with the additional information excluded, i.e., without considering the additional information. According to the disclosure, it is apparent that the additional information is not limited to the transmission range information, transmission area information, and transmission quantity information but instead includes all information that may affect the data transmission path.

It should be noted that the device configurations or examples of data transmission methods in multi-link environments shown and described in connection with FIGS. 1 to 12 are not intended to limit the scope of the present invention. In other words, all the components or operational steps illustrated in FIGS. 1 to 12 should not be construed as essential components to practice the present invention, and the present invention may be instead implemented with only some of the components without departing from the gist of the present invention.

The above-described operations may be realized by equipping a memory device retaining their corresponding program codes in any component of the UE or eNB. That is, the controller in the eNB or UE may execute the above-described operations by reading and executing the program codes stored in the memory device by a processor or central processing unit (CPU).

As described herein, various components or modules in the UE or eNB may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the disclosure have been described above, various changes may be made thereto without departing from the scope of the disclosure. Thus, the scope of the disclosure should not be limited to the above-described embodiments, and should instead be defined by the following claims and equivalents thereof.

The invention claimed is:

1. A method for transmitting data on a multi-link basis by a communication device connected to a plurality of links, the method comprising:
generating link state information including information about an environment of the plurality of links associated with at least one of a load, a traffic, allowed signal characteristics and a resource block of the plurality of links;
receiving link configuration information including information about an available link;
generating weights for the plurality of links based on the link state information and the link configuration information;
obtaining additional information associated with the plurality of links, the additional information comprising at least any one of message type information about a type of a message to be transmitted, service type information about a type of a service received by a terminal, transmission range information about a distance in which a data is to be transmitted, transmission area information about an area where the data is transmitted, and transmission quantity information about an quantity in which the data is to be transmitted;
adjusting the weights by reflecting the additional information;
selecting at least one link among the plurality of links based on the weights; and
transmitting data via the at least one link selected.

2. The method of claim 1, further comprising generating quality-of-service (QoS) information, wherein selecting the at least one link includes selecting the at least one link meeting the QoS information among the plurality of links.

3. The method of claim 1, further comprising selecting a replacement link among the plurality of links where the at least one selected link is unavailable, wherein transmitting the data includes transmitting the data via the replacement link.

4. The method of claim 1, wherein where the at least one selected link is a single link with a highest weight, the data is transmitted solely via the single link.

5. The method of claim 1, wherein where the at least one selected link includes a second plurality of links with different weights, the data is transmitted via each of the second plurality of links with the different weights.

6. The method of claim 1, wherein the link state information includes information about an environment of at least any one of a proximity-based services (ProSe) link and a long-term evolution (LTE) link.

7. The method of claim 1, wherein the link state information includes information about at least any one of a load for the plurality of links, a link resource, and an allowed signal strength.

8. A method for transmitting data on a multi-link basis by a data transmission device connected to a plurality of links, the method comprising:
generating link state information including information about an environment of the plurality of links associated with at least one of a load, a traffic, allowed signal characteristics and a resource block of the plurality of links and link configuration information including information about an available link;
generating weights for the plurality of links based on the link state information and the link configuration information;
obtaining additional information associated with the plurality of links, the additional information comprising at least any one of message type information about a type of a message to be transmitted, service type information about a type of a service received by a terminal, transmission range information about a distance in which a data is to be transmitted, transmission area information about an area where the data is transmitted, and transmission quantity information about an quantity in which the data is to be transmitted;
adjusting the weights by reflecting the additional information;
selecting at least one link among the plurality of links based on the weights; and
transmitting data via the at least one link selected.

9. A device configured to transmit data on a multi-link basis via a plurality of links, comprising:
a receiver configured to receive link configuration information including information about an available link;
a controller configured to generate link state information including information about an environment of the plurality of links associated with at least one of a load, a traffic, allowed signal characteristics and a resource block of the plurality of links,
generate weights for the plurality of links based on the link state information and the link configuration information,
obtain additional information associated with the plurality of links, the additional information comprising at least any one of message type information about a type of a message to be transmitted, service type information about a type of a service received by a terminal, transmission range information about a distance in which a data is to be transmitted, transmission area information about an area where the data is transmitted, and transmission quantity information about an quantity in which the data is to be transmitted,
adjust the weights by reflecting the additional information, and
select at least one link among the plurality of links based on the weights; and
a transmitter configured to transmit data via the at least one link selected.

10. The device of claim 9, wherein the controller is configured to generate quality-of-service (QoS) information and select the at least one link meeting the QoS information among the plurality of links.

11. A device configured to transmit data on a multi-link basis via a plurality of links, comprising:

a controller configured to generate link state information including information about an environment of the plurality of links associated with at least one of a load, a traffic, allowed signal characteristics and a resource block of the plurality of links and link configuration information including information about an available link, generate weights for the plurality of links based on the link state information and the link configuration information, obtain additional information associated with the plurality of links, the additional information comprising at least any one of message type information about a type of a message to be transmitted, service type information about a type of a service received by a terminal, transmission range information about a distance in which a data is to be transmitted, transmission area information about an area where the data is transmitted, and transmission quantity information about an quantity in which the data is to be transmitted, adjust the weights by reflecting the additional information, select at least one link among the plurality of links for which the weights are generated, and transmit data via the at least one link selected; and a transmitter configured to transmit the data via the at least one link selected.

* * * * *